(12) United States Patent
Szini et al.

(10) Patent No.: US 9,356,672 B2
(45) Date of Patent: May 31, 2016

(54) APPARATUS AND METHODS FOR ADAPTIVE ANTENNA DIVERSITY IN A MULTI-ANTENNA SYSTEM

(71) Applicant: Google Technology Holdings LLC, Mountain View, CA (US)

(72) Inventors: Istvan J. Szini, Grayslake, IL (US); Krishna K. Bellamkonda, Lake Zurich, IL (US); Eric L. Krenz, Crystal Lake, IL (US); Nischal Y. Patel, Gilberts, IL (US); Brett L. Robertson, Mundelein, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/449,939

(22) Filed: Aug. 1, 2014

(65) Prior Publication Data

US 2016/0036508 A1 Feb. 4, 2016

(51) Int. Cl.
*H04B 7/08* (2006.01)
*H04B 7/06* (2006.01)
*H04B 17/00* (2015.01)

(52) U.S. Cl.
CPC ............ *H04B 7/0608* (2013.01); *H04B 7/0814* (2013.01); *H04B 17/00* (2013.01)

(58) Field of Classification Search
CPC .. H04B 7/0413; H04B 7/0608; H04B 7/0802; H04B 7/0805; H04B 7/0808; H04B 7/0814; H04B 7/0817; H04B 17/00; H04B 17/10; H04B 17/309
See application file for complete search history.

(56) References Cited

U.S. PATENT DOCUMENTS

| | | | |
|---|---|---|---|
| 5,740,526 A * | 4/1998 | Bonta ................. | H04B 7/0817 375/347 |
| 7,974,359 B2 | 7/2011 | Gorokhov et al. | |
| 8,121,565 B2 * | 2/2012 | Rhee .................... | H04B 7/0848 455/137 |
| 8,144,797 B2 | 3/2012 | Mujtaba et al. | |
| 2007/0207837 A1 * | 9/2007 | Nakaya ............... | H04B 7/0874 455/562.1 |
| 2009/0196371 A1 * | 8/2009 | Yamamoto .......... | H04B 7/0808 375/267 |
| 2011/0081869 A1 * | 4/2011 | Breit ................... | H04B 7/0413 455/67.11 |
| 2013/0322562 A1 | 12/2013 | Zhang et al. | |

* cited by examiner

*Primary Examiner* — David B. Lugo
(74) *Attorney, Agent, or Firm* — Faegre Baker Daniels LLP (57) ABSTRACT

Apparatuses and methods are disclosed for determining a dominant figure-of-merit for an antenna system comprising a primary antenna, and at least two diversity antennas. The dominant figure-of-merit is determined from at least two figure-of-merit types related to performance of the primary antenna when paired with one or the other of the at least two diversity antennas. The disclosed apparatuses and methods include switching to one or the other of the at least two diversity antennas, to obtain the dominant figure-of-merit, in response to a signal quality metric's relationship to the at least two figure-of-merit types.

17 Claims, 4 Drawing Sheets

APPARATUS AND METHODS FOR ADAPTIVE ANTENNA DIVERSITY IN A MULTI-ANTENNA SYSTEM

FIELD OF THE DISCLOSURE

The present disclosure relates generally to antennas and multiple-input, multiple-output (MIMO) antennas systems with diversity reception, and more particularly to mobile devices employing such MIMO antenna systems.

BACKGROUND

Mobile devices may incorporate multiple antennas, or an antenna array, for diversity reception and for implementing spatial multiplexing. Spatial multiplexing involves splitting a high data rate signal into two or more separate data streams that are intended to arrive at a receiver antenna array with different spatial signatures such that the two or more separate data streams can be reassembled to construct the high data rate signal. At least two separate mobile device antennas, or two antenna elements of an antenna array, each receive one of the separate data streams. Therefore, spatial multiplexing may be considered a form of antenna diversity reception.

The goal of antenna diversity reception is to take advantage of decorrelation between the diversity antennas. The decorrelation may be achieved by physical placement, polarization or by using differing antenna beam patterns. Mobile device diversity and MIMO (multiple-input, multiple-output) antenna systems have been developed based on static figure-of-merit ("FoM") requirements, total efficiency, gain imbalance and envelope correlation coefficient values (i.e. antenna correlation) that are fixed regardless of prevalent operating parameters or the environment in which the mobile device is operating.

Performance of the MIMO system may be negatively impacted by changes in the radiated channel conditions and the user's position and handgrip on the mobile device, because the hand position may impair radio frequency (RF) reception by the MIMO antennas. For this and other reasons, challenges exist for achieving good performance of diversity antenna systems in a mobile device.

DETAILED DESCRIPTION

Briefly, the disclosed embodiments provide apparatuses and methods that obtain real time performance measurements and adaptively select MIMO antennas, in response to the real time performance measurements, to improve MIMO antenna performance under given conditions. More particularly, the disclosed embodiments prioritize envelope correlation over antenna efficiency and gain imbalance, or vice versa, based on the real time performance measurements. The prioritization is achieved based on a discovery of a relationship between environment signal-to-noise ratio (SNR), antenna correlation and gain imbalance. Specifically, characteristics in which a MIMO antenna figure of merit (FoM) requirement varies, depending on the environment SNR in which the MIMO device is operating, is advantageously used in the various disclosed embodiments.

One disclosed method of operation includes determining a dominant figure-of-merit for an antenna system comprising a primary antenna, and at least two diversity antennas. The dominant figure-of-merit is determined from at least two figure-of-merit requirements (or figure-of-merit types) related to performance of the primary antenna when paired with one or the other of the at least two diversity antennas. The method of operation includes switching to one or the other of the at least two diversity antennas, to obtain the dominant figure-of-merit, in response to a signal quality metric relationship to the at least two figure-of-merit types. The method may further include obtaining the signal quality metric using a first signal quality metric measurement for the primary antenna and a first diversity antenna having a first orientation with respect to the primary antenna, and a second signal quality metric measurement for the primary antenna and a second diversity antenna having a second orientation with respect to the primary antenna. The dominant figure-of-merit is then determined based on the signal quality metric's relation to an inflection point in an empirically determined relationship between figure-of-merit types and data throughput. In the present embodiments, empirical data for known antennas has been found to show a deterministic correlation of signal-to-noise ratio and data throughput to the figure-of-merit types. This deterministic correlation was discovered by way of collecting empirical data. More specifically, signal-to-noise ratios above the inflection point indicate selection of an antenna pair having a first figure-of-merit type as the dominant figure-of-merit and signal-to-noise ratios below the inflection point indicate selection of an antenna pair having a second figure-of-merit type as the dominant figure-of-merit.

In one embodiment, the method of operation switches to one of the diversity antennas that has a lower antenna correlation with the primary antenna when antenna correlation is the dominant figure of merit, and switches to another of the diversity antennas that has a lower gain imbalance with the primary antenna when gain imbalance is the dominant figure of merit.

Another disclosed method of operation includes calculating an effective signal quality metric using a first signal quality metric measurement for a primary antenna and a first diversity antenna that has a first orientation with respect to the primary antenna, and a second signal quality metric measurement for the primary antenna and a second diversity antenna that has a second orientation with respect to the primary antenna. The method of operation then includes switching between the first diversity antenna and the second diversity antenna in response to the effective signal quality metric's relation to a threshold. More specifically, the threshold indicates dominance of a first figure-of-merit type for values above the threshold and dominance of a second figure-of-merit type for values below the threshold. In one embodiment, an effective signal-to-noise ratio is calculated as the effective signal quality metric. The effective signal-to-noise ratio is calculated using a first signal-to-noise ratio for the primary antenna and the first diversity antenna and a second signal-to-noise ratio for the primary antenna and the second diversity antenna.

The method may therefore further include switching between the first diversity antenna and the second diversity antenna based on an inflection point in a relationship of signal-to-noise ratio and data throughput to the first figure-of-merit type and to the second figure-of-merit type, where the inflection point is used as the threshold. The relationship showing the inflection point is a deterministic correlation of signal-to-noise ratio and data throughput to the first figure-of-merit type and to the second figure-of-merit type, where the inflection point is used as the threshold. The deterministic correlation was arrived at in the present embodiments by the collection of empirical data. More specifically, signal-to-noise ratios above the inflection point indicate selection of an antenna pair having lower antenna correlation with the primary antenna and signal-to-noise ratios below the inflection point indicate selection of an antenna pair having lower gain imbalance with the primary antenna. In other words, antenna correlation is the first figure-of-merit type and gain imbalance is the second figure-of-merit type.

In some embodiments, the method of operation may include predicting the effective signal quality metric based on a user history and preselecting a diversity antenna in response to the prediction.

A disclosed apparatus that performs the disclosed methods of operations includes at least one transceiver, a primary antenna, a first diversity antenna that has a first placement with respect to the primary antenna, a second diversity antenna that has a second placement with respect to the primary antenna, and antenna selection logic. The antenna selection logic is operatively coupled to the primary antenna, the first diversity antenna, the second diversity antenna and the at least one transceiver. The antenna selection logic is operative to determine a dominant figure-of-merit from at least two figure-of-merit types related to performance of the primary antenna when paired with one or the other of the first diversity antenna or the second diversity antenna, and switch to one or the other of the two diversity antennas, to obtain the dominant figure-of-merit, in response to a signal quality metric's relationship to the at least two figure-of-merit types.

The antenna selection logic is also operative to obtain the signal quality metric using a first signal quality metric measurement for the primary antenna and the first diversity antenna, and a second signal quality metric measurement for the primary antenna and the second diversity antenna. The antenna selection logic determines the dominant figure-of-merit based on the signal quality metric's relation to an inflection point in a relationship of signal-to-noise ratio and data throughput to the figure-of-merit types. More specifically, signal-to-noise ratios above the inflection point indicate selection of an antenna pair having a first figure-of-merit type as the dominant figure-of-merit and signal-to-noise ratios below the inflection point indicate selection of an antenna pair having a second figure-of-merit type as the dominant figure-of-merit.

Another disclosed apparatus includes at least one transceiver, a primary antenna, a first diversity antenna having a first orientation with respect to the primary antenna, and a second diversity antenna having a second orientation with respect to the primary antenna. The apparatus also includes antenna selection logic that is operatively coupled to the primary antenna, the first diversity antenna, the second diversity antenna and to the at least one transceiver. The antenna selection logic is operative to calculate an effective signal quality metric using a first signal quality metric measurement for the primary antenna and the first diversity antenna, and a second signal quality metric measurement for the primary antenna and the second diversity antenna. The antenna selection logic switches between the first diversity antenna and the second diversity antenna in response to the effective signal quality metric's relation to a threshold. The threshold indicates dominance of a first figure-of-merit type for values above the threshold and dominance of a second figure-of-merit type for values below the threshold.

In one embodiment, the antenna selection logic calculates an effective signal-to-noise ratio as the effective signal quality metric. The effective signal-to-noise ratio is calculated using a first signal-to-noise ratio for the primary antenna and the first diversity antenna and a second signal-to-noise ratio for the primary antenna and the second diversity antenna. The antenna selection logic may then switch between the first diversity antenna and the second diversity antenna based on an inflection point in a relationship of signal-to-noise ratio and data throughput to the first figure-of-merit type and to the second figure-of-merit type where the inflection point is used as the threshold. More particularly, signal-to-noise ratios above the inflection point indicate selection of an antenna pair that has lower antenna correlation with the primary antenna and signal-to-noise ratios below the inflection point indicate selection of an antenna pair that has lower gain imbalance with the primary antenna. In other words, antenna correlation is the first figure-of-merit type and gain imbalance is the second figure-of-merit type. The relationship may be obtained by collected empirical data for the antenna pairs or antenna arrays used in the mobile device.

In some embodiments, the apparatus also includes memory, operative to store a user profile including a user history, and condition prediction logic. The condition prediction logic is operatively coupled to the memory and to the antenna selection logic, and is operative to predict the effective signal quality metric based on the user history stored in the memory. The condition prediction logic sends a control signal to the antenna selection logic to preselect a diversity antenna in response to the prediction.

Another disclosed apparatus includes at least one transceiver and a plurality of antenna systems with each antenna system including at least two antennas such as an antenna array. The apparatus also includes antenna selection logic that is operatively coupled to the plurality of antenna systems and to the at least one transceiver. The antenna selection logic is operative to determine a dominant figure-of-merit from at least two figure-of-merit types related to performance of the each of the antenna systems. The antenna selection logic may then switch to an appropriate antenna system in order to obtain the dominant figure-of-merit, in response to a signal quality metric's relationship (i.e. a deterministic correlation) to the at least two figure-of-merit types.

The antenna selection logic is also operative to obtain the signal quality metric using a plurality of signal quality metric measurements for the each antenna system. The antenna selection logic then determines the dominant figure-of-merit based on the signal quality metric's relation to an inflection point in a relationship (which exhibits a deterministic correlation) of signal-to-noise ratio and data throughput to the figure-of-merit types. Signal-to-noise ratios above the inflection point indicate selection of an antenna system that has a first figure-of-merit type as the dominant figure-of-merit and signal-to-noise ratios below the inflection point indicate selection of an antenna system that has a second figure-of-merit type as the dominant figure-of-merit.

Figure 1:
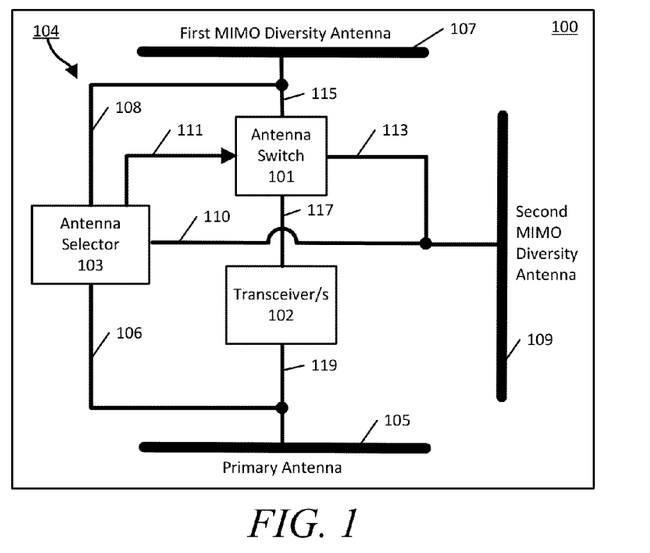
FIG. 1 is a block diagram of an example mobile device having multiple-input/multiple-output antennas (MIMO) and antenna selection logic in accordance with an embodiment.

Turning now to the drawings wherein like numerals represent like components, FIG. 1 is a block diagram of a mobile device 100 having antenna selection logic 104 in accordance with the embodiments. The mobile device 100 includes a primary antenna 105, a first MIMO diversity antenna 107 and a second MIMO diversity antenna 109. The primary antenna 105 is operatively coupled to one or more transceivers 102 via RF coupling 119. The first MIMO diversity antenna 107 is operatively coupled to an antenna switch 101 via RF coupling 115 and the second MIMO diversity antenna 109 is operatively coupled to the antenna switch 101 via RF coupling 113. The first MIMO diversity antenna 107 and the second MIMO diversity antenna 109 are operatively coupled to the transceivers 102 through the antenna switch 101 and RF coupling 117 between the antenna switch 101 and the transceivers 102.

The first MIMO diversity antenna 107 and the second MIMO diversity antenna 109 are configured and positioned such that one of the two antennas provides low gain imbalance but with any antenna correlation to the primary antenna 105, while the other antenna of the two antennas provides low antenna correlation to the primary antenna 105 but with any gain imbalance. In other words one of the two antennas may be positioned for optimized antenna correlation without considering the gain imbalance, while the other of the two antennas may be positioned for optimized gain imbalance without considering the antenna correlation. For example, the first MIMO diversity antenna 107 may provide high correlation to the primary antenna 105 and low gain imbalance. The second MIMO diversity antenna 109 may provide low correlation, for example by being orthogonally polarized with respect to the primary antenna 105, and may provide high gain imbalance. The terms "antenna correlation" (also "correlation") and "gain imbalance" are also each referred to herein individually as a "figure-of-merit" or as a "figure-of-merit type." In other words, "antenna correlation" is one example of a figure-of-merit or figure-of-merit type and "gain imbalance" is another example of a figure-of-merit or figure-of-merit type.

As understood by those of ordinary skill, it is preferable to have low correlation and low gain imbalance however a tradeoff must be made in any design because of limitations related to MIMO antenna system placement, user head and hand effect, mismatch and insertion losses, source-pull complex mismatch, among other design restrictions imposed on a mobile device. It is to be understood that FIG. 1 is an example only and that the actual positions of the primary antenna 105, first MIMO diversity antenna 107 and second MIMO diversity antenna 109 may be different, in accordance with the embodiments, from the example shown in FIG. 1. Specifically, the actual positions and/or configurations of the MIMO diversity antennas may differ with respect to the primary antenna, and to each other, however the MIMO diversity antennas will be positioned and configured as noted above regarding the tradeoff between correlation and gain imbalance.

The terms "high" and "low" as used herein are relative terms that are to be construed such that one of the MIMO diversity antennas exhibits a "better" or "worse" performance with respect to the other of the two MIMO diversity antennas by comparison of measured performance values between the two antennas, but irrespective of the actual numerical range of any such measured performance value. More particularly, a MIMO diversity antenna exhibiting a "low" correlation to the primary antenna 105 is herein considered as exhibiting a "better" correlation than a MIMO diversity antenna exhibiting a "high" correlation (i.e. "worse") to the primary antenna 105. A MIMO diversity antenna exhibiting a "low" gain imbalance with respect to the primary antenna 105 is herein considered as exhibiting a "better" gain imbalance than a MIMO diversity antenna exhibiting a "high" gain imbalance (i.e. "worse") with respect to the primary antenna 105. Therefore, by comparison of correlation and gain imbalance measurements for the first MIMO diversity antenna 107 and the second MIMO diversity antenna 109, one of the two antennas may be found to have a "high" or "higher" correlation and a "low" or "lower" gain imbalance and the other may be found to have a "low" or "lower" correlation and a "high" or "higher" gain imbalance with respect to each other by the comparison.

Each antenna is also operatively coupled to an antenna selector 103 in accordance with the embodiments. For example, the primary antenna 105 is operatively coupled to the antenna selector 103 via RF coupling 106. The first MIMO diversity antenna 107 is operatively coupled to the antenna selector 103 via RF coupling 108 and the second MIMO diversity antenna 109 is operatively coupled to the antenna selector 103 via RF coupling 110. The antenna selection logic 104 therefore includes the antenna switch 101, the antenna selector 103, and the various RF coupling.

It is to be understood that the various "RF coupling" described may include, but is not limited to, transmission lines and matching networks as understood by those of ordinary skill. For example, the transmission lines may be implemented using microstrip, stripline or any suitable RF circuit technology as understood by those of ordinary skill and may include transmission line elements such as capacitances or inductances, discrete components, or combinations thereof as needed to implement matching networks between the various components.

The antenna selector 103 monitors one or more performance metrics between the primary antenna 105, the first MIMO diversity antenna 107 and the second MIMO diversity antenna 109. The antenna selector 103 is operative to control the antenna switch 101 to switch between the first MIMO diversity antenna 107 and the second MIMO diversity antenna 109 based on the monitored one or more performance metrics. In the various embodiments, the adaptive antenna system shown in FIG. 1, including the antenna switch 101, may be implemented using, for example, antenna placement switching, parasitic resonators, variable phase shifters, transmission line switching, etc., or any other suitable components as understood by those of ordinary skill.

Figure 2:
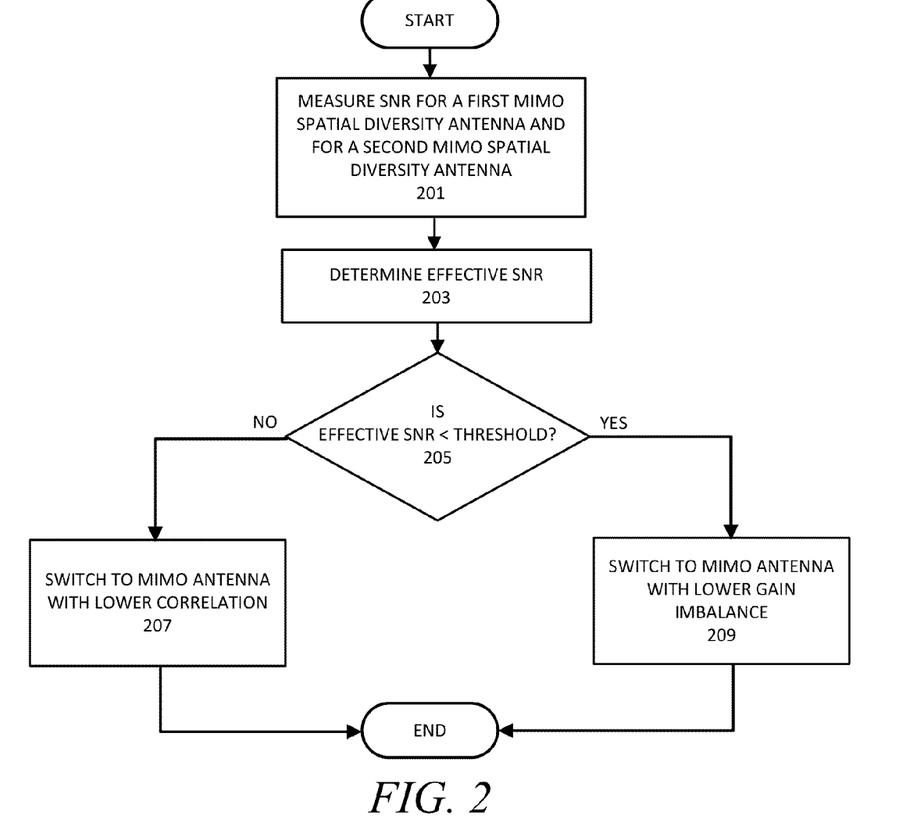
FIG. 2 is a flow chart of an example method of operation of the mobile device shown in FIG. 1.

FIG. 2 is a flowchart that illustrates a method of operation of the mobile device 100 in accordance with an embodiment. The method of operation begins and in operation block 201 the antenna selector 103 determines a signal quality metric, such as signal-to-noise ratio (SNR) or signal-to-interference-plus-noise-ratio (SINR), for a signal obtained using the primary antenna 105 and the first MIMO diversity antenna 107. The antenna selector 103 also measures SNR or SINR using the primary antenna 105 and the second MIMO diversity antenna 109. In operation block 203, the antenna selector 103 determines an effective SNR based on the measurement conducted in operation block 201. For example, the effective SNR may be calculated as an average SNR using a first SNR measurement for the primary antenna 105 when paired with the first MIMO diversity antenna 107, and a second SNR measurement for the primary antenna 105 when paired with the second MIMO diversity antenna 109. The effective SNR may then be calculated as an average SNR or as a weighted mean. As a further example, if the primary antenna 105 is represented by "ant0" and the first MIMO diversity antenna 107 is represented by "ant1," then an effective SINR may be calculated as: $SINR_{eff} = [(wt1 \times SINR(ant0)) + (wt2 \times SINR$ (ant1))]; where "wt1" and "wt2" are weighting factors calculated by statistical correlation of SINR(ant0) to effective CQI (channel quality indicator) and SINR(ant1) to effective CQI using empirical data collected using reference MIMO antennas with known antenna correlation.

In decision block 203, if the effective SNR (or effective SINR) is above a threshold, the method of operation proceeds to operation block 207. In operation block 207, the antenna selector 103 provides the control signal 111 to control the antenna switch 101 and switch to the MIMO antenna determined to provide low correlation and high gain imbalance. More particularly, the second MIMO diversity antenna 109 is selected by the antenna selector 103 because this antenna has been designed and configured to provide low correlation and high gain imbalance. The method of operation then ends.

If the effective SNR is below the threshold in decision block 205, the method of operation proceeds to operation block 209. In operation block 209, the antenna selector 103 provides the control signal 111 to control the antenna switch 101 and switch to the MIMO antenna determined to provide high correlation and low gain imbalance. More particularly, the first MIMO diversity antenna 107 is selected by the antenna selector 103 because this antenna has been designed and configured to provide high correlation and low gain imbalance. The method of operation then ends.

Among other advantages, the above described method of operation is based on the discovery that the prioritization of the antenna FoM changes depending on mobile device operating environment SNR. While the antenna envelope correlation has high priority in high SNR conditions, total efficiency and gain imbalance has very limited impact on MIMO antenna performance. On the other hand, in low SNR conditions, the envelope correlation (also referred to herein as "antenna correlation") has very limited or null impact in MIMO antenna performance while total efficiency and gain imbalance has higher priority. Put another way, different FoM types are dominant depending on operating environment SNR. The dominant FoM type as used herein refers to the FoM type having the largest impact on throughput for the given operating environment SNR.

Therefore, the adaptive antenna system of the disclosed embodiments changes the MIMO antenna configuration as triggered by real time environmental SNR conditions. For high SNR conditions the antenna system is adapted to optimize and prioritize low envelope correlation while total efficiency and gain imbalance are de-prioritized. For low SNR conditions the antenna system is configured to optimize and prioritize high total efficiency and low gain imbalance while de-prioritizing a low envelope correlation coefficient. In some embodiments, "low" SNR may be considered to be SNR that is less than about 6 dB. A "high" SNR condition may therefore be considered to be 6 dB and above.

Figure 3:
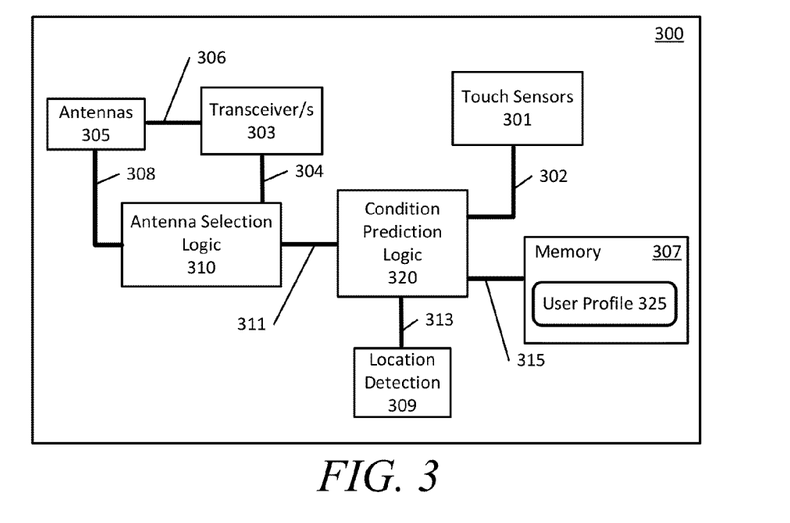
FIG. 3 is a block diagram of an example mobile device having multiple-input/multiple-output antennas (MIMO), antenna selection logic and condition prediction logic in accordance with an embodiment.

Further, in some embodiments, a mobile device may predict the environmental SNR and trigger MIMO antenna adaptation in response to such predictions. Turning to FIG. 3, another example mobile device 300 is illustrated and which is one example apparatus in accordance with the embodiments. The mobile device 300 includes antennas 305 having a primary antenna and at least two MIMO diversity antennas. The primary antenna of the antennas 305 is operatively coupled to the transceivers 303 by RF coupling 306. The MIMO diversity antennas of antennas 305 are operatively coupled to antenna selection logic 310 by RF coupling 308, and to the transceivers 303 by RF coupling 304 which provides the switched output of antenna selection logic 310. In some embodiments, the antennas 305 may include one or more antenna systems. An antenna system may have multiple antenna elements such as an antenna array. Each antenna array or antenna system may be evaluated by a FoM for the antenna system or antenna array.

The mobile device 300 also includes a set, or an array, of touch sensors 301 that are positioned about the mobile device 300 housing and that are operative to sense the user's fingers and hand when the user grips the mobile device 300 housing. The touch sensors 301 may be, but are not limited to, infrared ("IR") touch sensors, capacitive touch sensors, or combinations thereof. The touch sensors 301 are operatively connected to condition prediction logic 320 by coupling 302 and provide sensor outputs to the condition prediction logic 320 (as inputs). The condition prediction logic 320 may also be operatively coupled to location detection logic 309 by coupling 313 such that the condition prediction logic 320 is operative to receive location data. The condition prediction logic 320 is operatively coupled to memory 307 by read/write connection 315 such that the condition prediction logic 320 may read from and write to a user profile 325 stored in the memory 307.

The condition prediction logic 320 is operatively coupled to the antenna selection logic 310 by coupling 311 to send prediction data to the antenna selection logic 310. For example, the condition prediction logic 320 receives sensor data from the touch sensors 302 and may determine the position of the user's fingers and hand on the mobile device 300 housing. Because the user's hand position may cause impairment to RF reception by the MIMO diversity antennas, the condition prediction logic 320 may predict that a "low" or "high" SNR condition will result and may send a flag ("low" SNR predict flag or "high" SNR predict flag) to the antenna selection logic 310. The antenna selection logic 310 may then use the prediction to switch to the appropriate MIMO diversity antenna as an initial setting (i.e. prior to determination of the actual SNR condition).

In some embodiments, the condition prediction logic 320 may obtain additional data, in addition to data received from the touch sensors 301, and may create a user profile 325 that includes the obtained data for use in predictions. For example, the condition prediction logic 320 may collect user history for data call and voice calls including time stamps and location data stamps and store this history information in the user profile 325. The condition prediction logic 320 may also obtain SNR measurement data from the antenna selection logic 310 for these data calls and voice calls. Based on past activities, the condition prediction logic 320 may therefore then predict the SNR based on past SNR measurements associated with these past activities by reading the user profile 325. For example, if the user profile 325 data shows that the user routinely makes a data call at 3:00 pm on a certain day and time, and at a certain location, and the measured SNR indicated selection of a certain MIMO diversity antenna, the condition prediction logic 320 will make this prediction determination and will send the appropriate SNR predict flag to the antenna selection logic 310. In this way, the MIMO diversity antenna appropriate for the predicted condition can be selected in advance which enhances the mobile device 300 performance and the user's experience with the device.

Figure 4:
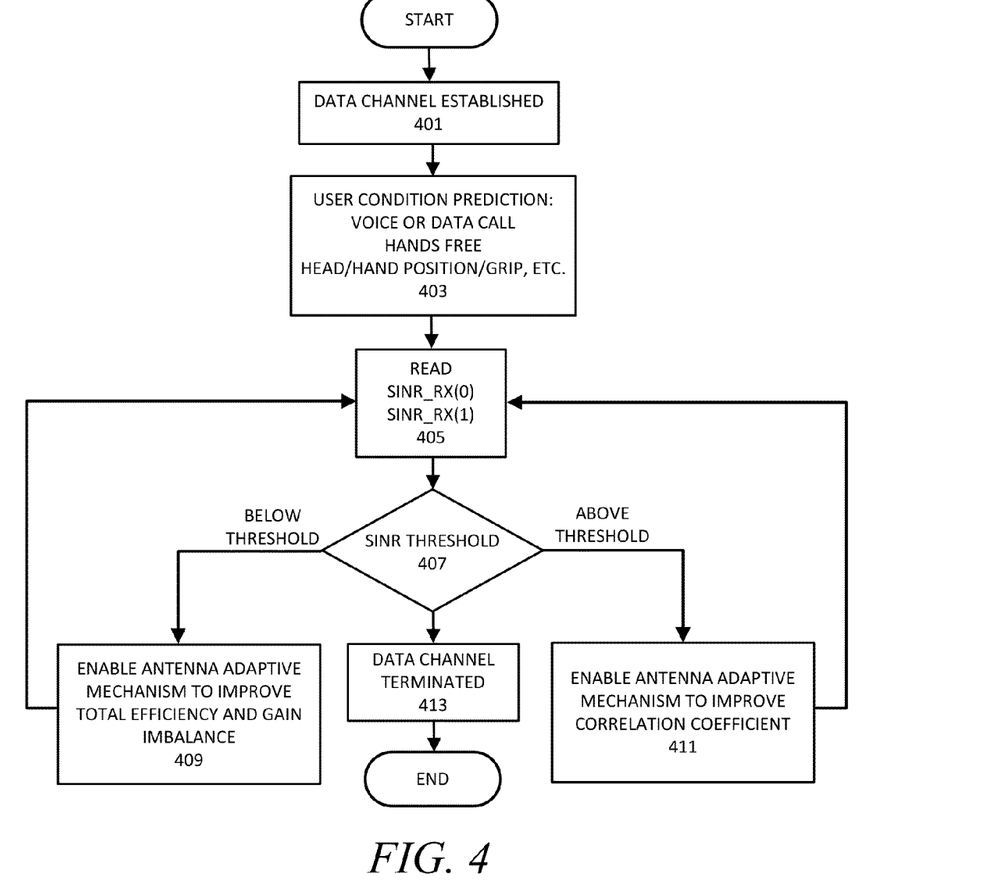
FIG. 4 is a flow chart of an example method of operation of the mobile device shown in FIG. 3.

The flowchart of FIG. 4 provides an example method of operation for the mobile device 300. The method of operation begins and, in operation block 401, a data channel is established by the transceivers 303. In operation block 430, the condition prediction logic 320 may check the user profile 325 for similar activity by the mobile device 300. The user profile 325 data may include times and dates when voice and data calls were made, the hand grip used (based on touch sensor 301 data), the location, and the SINR measurements obtained for those calls, etc. Based on the user profile 325 data, the condition prediction logic 320 may send an appropriate SNR (or SINR) predict flag to the antenna selection logic 310 which may then preselect a MIMO diversity antenna.

In operation block 405, the antenna selection logic 310 measures the real time signal-to-noise-and-interference (SINR) value for each MIMO diversity antenna with respect to the primary antenna. In decision block 407, the antenna selection logic 310 determines an effective SINR and checks it against a threshold. If the effective SINR is below the threshold, the method of operation proceeds to operation block 409 and the antenna selection logic 310 selects a MIMO diversity antenna to prioritize total efficiency and gain imbalance (i.e. to obtain low gain imbalance). If however the effective SINR is above the threshold, the method of operation proceeds to operation block 411 and the antenna selection logic 310 selects a MIMO diversity antenna to prioritize antenna correlation (i.e. to obtain low correlation). In either case, the method of operation loops back to operation block 405 and continues until the data channel is terminated in operation block 413, at which point the method of operation ends.

Figure 5:
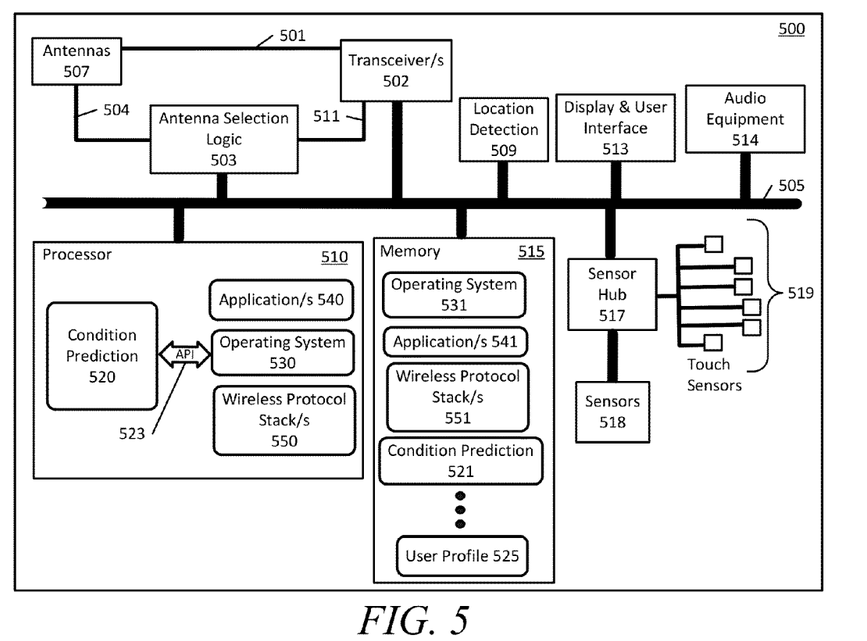
FIG. 5 is a block diagram of an example mobile device having multiple-input/multiple-output antennas (MIMO), antenna selection logic and condition prediction logic in accordance with an embodiment.

In FIG. 5, another example mobile device 500 includes at least one internal communication bus 505 which provides operative coupling between the various components. Each of the various components of the mobile device 500 that are operatively coupled to the communication bus 505 may accordingly send information to, or receive information from, a processor 510. In addition to the processor 510, the mobile device 100 components include, but are not limited to, transceivers 502, antenna selection logic 503, antennas 507, location detection logic 509 (such as, but not limited to, a GPS receiver), display and user interface 513, audio equipment 514, memory 515, and a sensor hub 517.

The sensor hub 517 is operatively coupled to a plurality of sensors 518 which may include thermal sensors, proximity sensors, accelerometers, gyroscopic sensors, light sensors, etc. The sensor hub 517 is also operatively coupled to a set of touch sensors 519 which are position about the housing of the mobile device 500 and which are operative to sense the user's hand and fingers when placed upon the housing, and to send data to the sensor hub 517. The touch sensors 519 may be optical sensors, capacitive sensors, or combinations of both. The sensor hub 517 is a low power processor that offloads the processor 510 from some tasks such as obtaining data from the sensors 518 and from touch sensors 519. The sensor hub 517 may provide functions while the processor 510 is placed in a sleep mode in order to conserve mobile device 500 battery power. The sensor hub 517 is operative to receive data from the various sensors and to convey the data to the processor 510 over the internal communication bus 505.

Similar to the mobile device 300 in FIG. 3, the mobile device 500 includes antennas 507 having a primary antenna and at least two MIMO diversity antennas. The primary antenna of the antennas 507 is operatively coupled to the transceivers 502 by RF coupling 501. The MIMO diversity antennas of antennas 507 are operatively coupled to antenna selection logic 503 by RF coupling 504, and to the transceivers 502, by RF coupling 511 which provides the switched output of antenna selection logic 503. In some embodiments, the antennas 507 may include one or more antenna systems. An antenna system may have multiple antenna elements such as an antenna array. Each antenna array or antenna system may be evaluated by a FoM for the antenna system or antenna array.

The processor 510 is operative to execute executable instructions (also referred to as "executable code" or "code") stored in memory 515, including operating system executable code 531 to run at least one operating system 530, wireless protocol stack code 551 to run one or more wireless protocol stacks 550, and application (or "user space") executable code 541 to run one or more applications 540. In accordance with the embodiments, the processor 510 is also operative to execute condition prediction code 521 to implement condition prediction logic 520.

The condition prediction logic 520 may interact and communicate with the operating system 530 by one or more APIs of a suite of APIs 523 (application programming interfaces) or by other appropriate operative coupling. The condition prediction logic 520 is operative to communicate with the sensor hub 517 to obtain data from the touch sensors 519, the sensors 518 or combinations thereof. This data may include information about the position of the mobile device 500, such as whether the mobile device 500 is stationary, in a docking station, placed flatly on a table surface, etc. and other information related to the ambient environment surrounding the mobile device 500. The location detection logic 509 may also be accessed by the condition prediction logic 520 to obtain location information for the mobile device 500. The condition prediction logic 520 may collect and aggregate this data into a user profile 525 stored in memory 515.

The data contained in the user profile 525 is time and date stamped and geotagged using location data from the location detection logic 509. The operation of the condition prediction logic 520 is similar to the condition prediction logic 320 operation described with respect to FIG. 3. That is, the condition prediction logic 520 may obtain data from the touch sensors 519 and from position sensors and other sensors or sensors 518, and may create the user profile 525 that includes the obtained data for use in predictions.

In the example mobile device 500, the condition prediction logic 520 may obtain SNR (or SINR) measurement data from the antenna selection logic 503 over the internal communication bus 505. The method of operation described with respect to FIG. 4 may therefore also be performed by the example mobile device 500.

It is to be understood that any of the above described software components (i.e. executable instructions or executable code) in the example mobile device 500 or any of the above described components of example mobile device 100 or mobile device 300 may be implemented as software or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the mobile devices illustrated in the drawing figures described herein provide examples of a mobile device and are not to be construed as a limitation on the various other possible mobile device implementations that may be used in accordance with the various embodiments.

More particularly, condition prediction logic may be a single component or may be implemented as any combination of DSPs, ASICs, FPGAs, CPUs running executable instructions, hardwired circuitry, state machines, etc., without limitation. Therefore, as one example, the condition prediction logic may be implemented using an ASIC or an FPGA. In another example, the antenna selection logic may be a combination of RF hardware for implementation of switching between MIMO diversity antennas, and software or firmware executed by a processor that makes the decision regarding when to switch to a given antenna, etc. These example embodiments and other embodiments are contemplated by the present disclosure.

Figure 6:
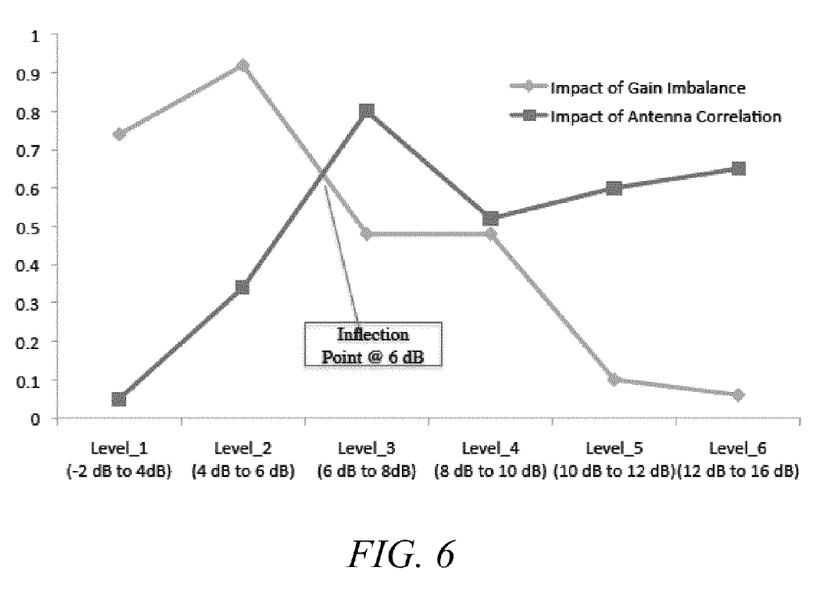
FIG. 6 is an example graph of a relationship that illustrates the impact of gain imbalance and antenna correlation on throughput, versus signal quality as measured by signal-to-noise ratio (SNR) in accordance with various embodiments.

FIG. 6 is an example graph plotting a discovered relationship between gain imbalance and throughput, and between antenna correlation and throughput, versus signal quality as measured by signal-to-noise ratio (SNR) in accordance with various embodiments. It is to be understood that the term SNR as used herein may also refer interchangeably to the term signal-to-noise-plus-interference ratio (SINR). The relationship in the graph of FIG. 6 may be considered as showing a deterministic correlation between gain imbalance and throughput, and between antenna correlation and throughput, versus signal quality as measured by SNR or SINR. The deterministic correlation shown in FIG. 6 was found through empirical data collected using antennas of known antenna correlation. The relationship is considered to be a deterministic correlation, as used herein, in that like empirical data may be collected for any antennas of known antenna correlation to determine an inflection point useful for switching to an antenna pair, or antenna array, having the dominant FoM type for the mobile device's measured environment. The relationship shown if FIG. 6 is therefore encoded in antenna selector 103 for mobile device 100 for use in making antenna selections as described herein. In mobile device 500 shown in the example embodiment of FIG. 5, the relationship shown in FIG. 6 may be encoded and stored in memory 515 for access and use by antenna selection logic 503. Alternatively, the FIG. 6 relationship may be encoded into antenna selection logic 503. The encoding may involve providing knowledge of the inflection point such that a threshold is defined (for example, by providing a threshold setting) for use in antenna selection decisions. The threshold may be defined in software or firmware, or by way of hardwired circuitry or logic circuitry, etc. In the graph of FIG. 6, gain imbalance versus throughput is indicated by diamond shaped data points and antenna correlation coefficient versus throughput is represented by square shaped data points. The vertical axis, or y-axis, represents deterministic correlation and the horizontal axis, or x-axis, represents signal quality as measured by SNR. As can be seen, for an example set of antennas using MIMO diversity antennas, an inflection point occurs at about 6 dB. More particularly, FIG. 6 illustrates that the antenna correlation takes on greater significance with respect to throughput than does gain imbalance for SNR levels above 6 dB. Conversely, the gain imbalance exhibits greater significance with respect to throughput for SNR levels below 6 dB. Therefore, this relationship information (i.e. a deterministic correlation) is made use of by antenna selection logic as described above with respect to the various example embodiments. More particularly, the 6 dB inflection point may be used to set the SNR threshold in decision block 205 of FIG. 2, and in decision block 407 of FIG. 4. Therefore, for SNR values above 6 dB the antenna selection logic will select the MIMO antenna pair optimizing for antenna correlation and, for SNR values below 6 dB the antenna selection logic will select the MIMO antenna pair optimizing for gain imbalance.

It is to be understood that, although the present disclosure discusses SNR as a signal quality metric used to determine a dominant FoM for an antenna pair, or for an antenna system, SINR ("signal-to-interference-plus-noise-ratio" or "signal-to-noise-plus-interference ratio") may be also be used interchangeably with SNR. In other words, a relationship may be shown between SINR and FoM values and throughput, and therefore an inflection point in such relationship plots may be used as the threshold, as disclosed and described in detail herein, to make antenna pair or antenna system selection decisions to improve throughput under the given environmental conditions (i.e. SINR conditions). The relationship involves a deterministic correlation between SINR and FoM values and throughput which was discovered by analysis of empirically collected data for antennas of known correlation.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   determining a signal quality metric using a first signal quality metric measurement for a primary antenna and a first diversity antenna having a first placement with respect to the primary antenna, and a second signal quality metric measurement for the primary antenna and a second diversity antenna having a second placement with respect to the primary antenna;
   comparing the determined signal quality metric to an inflection point threshold value, the inflection point threshold value determined from a relationship of signal-to-noise ratio and data throughput for each of at least two figure-of-merit types related to performance of the primary antenna when paired with one or the other of the at least two diversity antennas;
   determining a dominant figure of merit by determining a first figure-of-merit type as the dominant figure-of-merit if the determined signal quality metric is above the inflection point threshold value and a second figure-of-merit type as the dominant figure-of-merit if the determined signal quality metric is below the inflection point threshold value; and
   switching to one or the other of the at least two diversity antennas to prioritize the determined dominant figure-of-merit performance of the primary antenna when paired with one or the other of the at least two diversity antennas.

2. The method of claim 1, wherein switching to one or the other of the at least two diversity antennas, comprises:
   switching to one of the at least two diversity antennas having a lower antenna correlation with the primary antenna when antenna correlation is the dominant figure of merit; and
   switching to another of the at least two diversity antennas having a lower gain imbalance with the primary antenna when gain imbalance is the dominant figure of merit.

3. The method of claim 1, wherein determining the dominant figure-of-merit comprises:
   determining that antenna correlation is the dominant figure-of-merit when the signal quality metric is above the inflection point; and
   determining that gain imbalance is the dominant figure-of-merit when the signal quality metric is below the inflection point.

4. The method of claim 1, further comprising:
   calculating the signal quality metric using signal-to-noise ratios obtained for each diversity antenna of the at least two diversity antennas.

5. A method comprising:
   calculating an effective signal quality metric using a first signal quality metric measurement for a primary antenna and a first diversity antenna having a first placement with respect to the primary antenna, and a second signal quality metric measurement for the primary antenna and a second diversity antenna having a second placement with respect to the primary antenna; and
   switching between the first diversity antenna and the second diversity antenna in response to the effective signal quality metric's relation to a threshold, the threshold indicating dominance of a first figure-of-merit type for values above the threshold and dominance of a second figure-of-merit type for values below the threshold.

6. The method of claim 5, wherein calculating the effective signal quality metric, comprises:
calculating an effective signal-to-noise ratio as the effective signal quality metric, the effective signal-to-noise ratio calculated using a first signal-to-noise ratio for the primary antenna and the first diversity antenna and a second signal-to-noise ratio for the primary antenna and the second diversity antenna.

7. The method of claim 6, wherein switching between the first diversity antenna and the second diversity antenna in response to the effective signal quality metric's relation to the threshold, comprises:
switching between the first diversity antenna and the second diversity antenna based on an inflection point in a relationship of signal-to-noise ratio and data throughput to the first figure-of-merit type and to the second figure-of-merit type, the inflection point being the threshold, wherein signal-to-noise ratio above the inflection point indicates selection of an antenna pair having lower antenna correlation with the primary antenna and wherein signal-to-noise ratio below the inflection point indicates selection of an antenna pair having lower gain imbalance with the primary antenna, wherein antenna correlation is the first figure-of-merit type and gain imbalance is the second figure-of-merit type.

8. The method of claim 5, further comprising:
predicting the effective signal quality metric based on a user history; and
preselecting a diversity antenna in response to the prediction.

9. An apparatus comprising:
at least one transceiver;
a primary antenna;
a first diversity antenna having a first placement with respect to the primary antenna;
a second diversity antenna having a second placement with respect to the primary antenna; and
antenna selection logic, operatively coupled to the primary antenna, the first diversity antenna, the second diversity antenna and the at least one transceiver, the antenna selection logic operative to:
determine a signal quality metric using a first signal quality metric measurement for the primary antenna and the first diversity antenna, and a second signal quality metric measurement for the primary antenna and the second diversity antenna;
compare the determined signal quality metric to an inflection point threshold value, the inflection point threshold value determined from a relationship of signal-to-noise ratio and data throughput for each of at least two figure-of-merit types related to performance of the primary antenna when paired with one or the other of the at least two diversity antennas;
determine a dominant figure of merit by determining a first figure-of-merit type as the dominant figure-of-merit if the determined signal quality metric is above the inflection point threshold value and a second figure-of-merit type as the dominant figure-of-merit if the determined signal quality metric is below the inflection point threshold value; and
switch to one or the other of the at least two diversity antennas to prioritize the determined dominant figure-of-merit performance of the primary antenna when paired with one or the other of the at least two diversity antennas.

10. The apparatus of claim 9, wherein the antenna selection logic is further operative to:
switch to one of the diversity antennas having a lower antenna correlation with the primary antenna when antenna correlation is the dominant figure of merit; and
switch to another of the diversity antennas having a lower gain imbalance with the primary antenna when gain imbalance is the dominant figure of merit.

11. The apparatus of claim 9, wherein the antenna selection logic is further operative to:
determine that antenna correlation is the dominant figure-of-merit when the signal quality metric is above the inflection point; and
determine that gain imbalance is the dominant figure-of-merit when the signal quality metric is below the inflection point.

12. The apparatus of claim 9, wherein the antenna selection logic is further operative to:
calculate the signal quality metric using signal-to-noise ratios obtained for each diversity antenna when paired with the primary antenna.

13. An apparatus comprising:
at least one transceiver;
a primary antenna;
a first diversity antenna having a first orientation with respect to the primary antenna;
a second diversity antenna having a second orientation with respect to the primary antenna; and
antenna selection logic, operatively coupled to the primary antenna, the first diversity antenna, the second diversity antenna and the at least one transceiver, the antenna selection logic operative to:
calculate an effective signal quality metric using a first signal quality metric measurement for the primary antenna and the first diversity antenna, and a second signal quality metric measurement for the primary antenna and the second diversity antenna; and
switch between the first diversity antenna and the second diversity antenna in response to the effective signal quality metric's relation to a threshold, the threshold indicating dominance of a first figure-of-merit type for values above the threshold and dominance of a second figure-of-merit type for values below the threshold.

14. The apparatus of claim 13, wherein the antenna selection logic is further operative to calculate the effective signal quality metric, by calculating an effective signal-to-noise ratio as the effective signal quality metric, the effective signal-to-noise ratio calculated using a first signal-to-noise ratio for the primary antenna and the first diversity antenna and a second signal-to-noise ratio for the primary antenna and the second diversity antenna.

15. The apparatus of claim 14, wherein the antenna selection logic is further operative to switch between the first diversity antenna and the second diversity antenna in response to the effective signal quality metric's relation to the threshold, by:
switching between the first diversity antenna and the second diversity antenna based on an inflection point in a relationship of signal-to-noise ratio and data throughput to the first figure-of-merit type and to the second figure-of-merit type, the inflection point being the threshold, wherein signal-to-noise ratio above the inflection point indicates selection of an antenna pair having lower antenna correlation with the primary antenna and wherein signal-to-noise ratio below the inflection point indicates selection of an antenna pair having lower gain imbalance with the primary antenna, wherein antenna correlation is the first figure-of-merit type and gain imbalance is the second figure-of-merit type.

16. The apparatus of claim 13, further comprising:
memory, operative to store a user profile including a user history;
condition prediction logic, operatively coupled to the memory and to the antenna selection logic, the condition prediction logic operative to:
predict the effective signal quality metric based on the user history stored in the memory; and
send a control signal to the antenna selection logic to preselect a diversity antenna in response to the prediction.

17. An apparatus comprising:
at least one transceiver;
a plurality of antenna systems, each antenna system comprising at least two antennas;
antenna selection logic, operatively coupled to the plurality of antenna systems and to the at least one transceiver, the antenna selection logic operative to:

determine a signal quality metric using signal quality metric measurements for each antenna system of the plurality of antenna systems;

compare the determined signal quality metric to an inflection point threshold value, the inflection point threshold value determined from a relationship of signal-to-noise ratio and data throughput for each of at least two figure-of-merit types related to performance of each of the antenna systems;

determine a dominant figure of merit by determining a first figure-of-merit type as the dominant figure-of-merit if the determined signal quality metric is above the inflection point threshold value and a second figure-of-merit type as the dominant figure-of-merit if the determined signal quality metric is below the inflection point threshold value; and switch to an antenna system of the plurality of antenna systems to prioritize the determined dominant figure-of-merit performance of the plurality of antenna systems.

* * * * *